Oct. 17, 1950
J. H. CURTESS
2,526,067
FISHING POLE HOLDER
Filed April 23, 1949
2 Sheets-Sheet 1
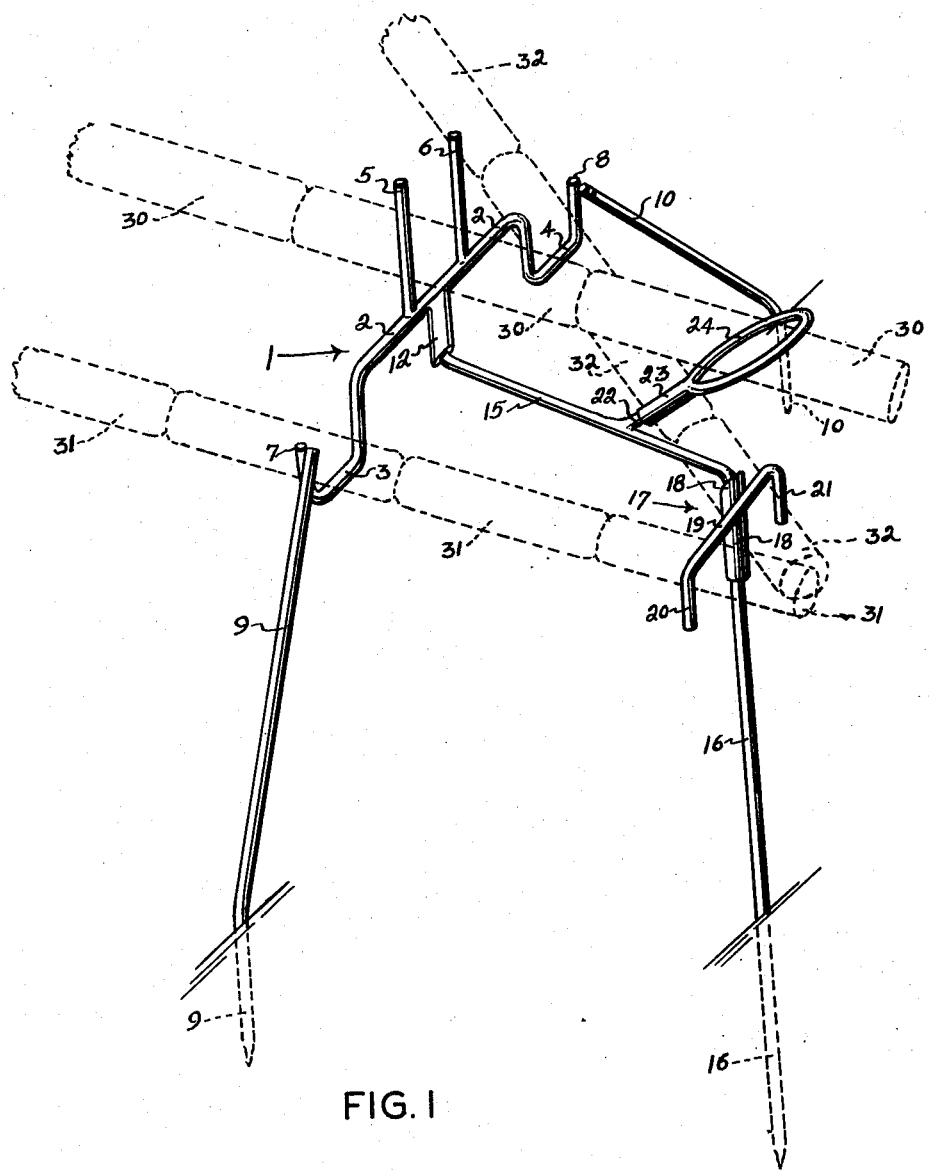
FIG. I
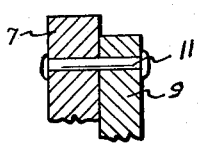
FIG. 3
James H. Curtess
INVENTOR,
BY
Bernard P. Melber
ATTORNEY Oct. 17, 1950   J. H. CURTESS   2,526,067
FISHING POLE HOLDER Filed April 23, 1949   2 Sheets-Sheet 2

James H. Curtess
INVENTOR,

BY
Bernard P. Miller
ATTORNEY

Patented Oct. 17, 1950

2,526,067

UNITED STATES PATENT OFFICE 2,526,067

FISHING POLE HOLDER

James H. Curtess, Oklahoma City, Okla.

Application April 23, 1949, Serial No. 89,287

2 Claims. (Cl. 248—42)

The present invention relates to the sport of angling for fish, and more particularly to what is commonly termed "bank fishing," wherein the fisherman operates from the bank of a stream or lake.

The principal object of the invention, is to provide a mounting mechanism or holder which will support a plurality of fishing poles on the bank of a stream or lake.

Another object is to provide a pole holder which supports the poles against dislocation by a biting fish, yet which makes them readily available to the fisherman when a bite occurs.

A further object is to provide a pole holder which may be dis-assembled or collapsed when not in use, thus making it easy to transport or to pack with other fishing and camping gear.

An additonal object is to provide a collapsible pole holder which is easy and simple to assemble or dis-assemble.

Another object is to provide a holder of this class which is comparatively cheap to manufacture.

Other objects will be apparent from the following description when taken in conjunction with the accompanying two sheets of drawings, wherein:

Figure 1 is a perspective view of the device assembled and operatively mounted in the surface of the earth, the dotted lines illustrating the butt ends or handles of three conventional fishing poles operatively supported thereby;

Like characters of reference designate like parts in those figures of the drawings in which they occur.

In the drawings:

Figure 2:
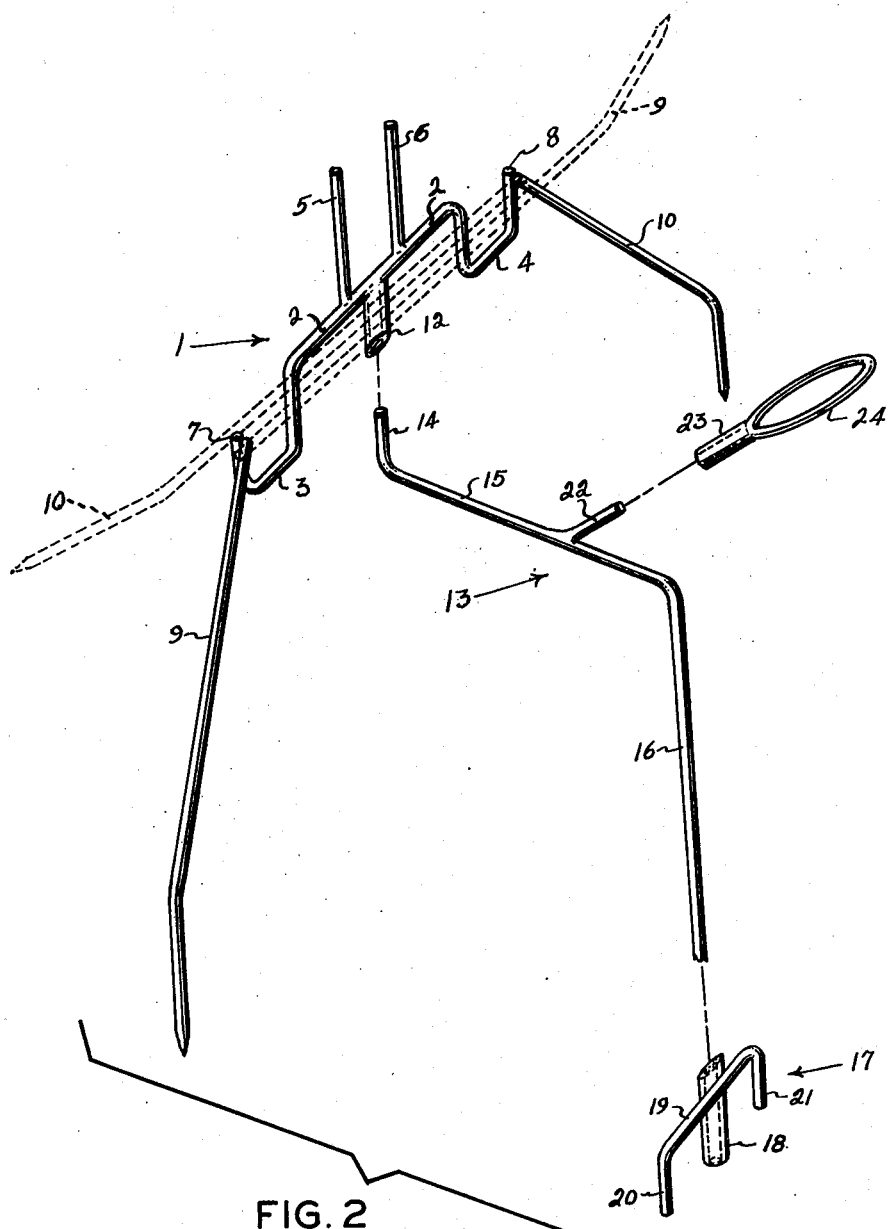
Figure 2 is an exploded perspective view illustrating the dis-assembly of the parts which combine to form the device, the dotted lines illustrating how the pivoted legs may be folded for stowing; and, Figure 3 is an enlarged fragmentary sectional view detailing the hinged connection of one of the legs to the front horizontal member.

The reference numeral 1 indicates, as a whole, a front horizontal pole supporting member which is made of metal rod, and which consists substantially of a straight central section 2 having two depending U-shaped pole nesting sections 3 and 4 at its respective left and right hand ends. The sections are deformities of the single rod which go to make up the front member 1. Intermediate its ends, the section 2 is provided with two spaced upwardly projecting pins 5 and 6 which form therebetween a nest for seating another fishing pole.

The respective left and right hand ends 7 and 8 of the front member 1 has stiff legs 9 and 10 which have their upper ends pivotally connected to the member 1. The manner of connecting the legs 9 and 10 to the member is common to both legs, and merely consists of a horizontal pivot pin 11. Fig. 3 shows the pivot pin 11 which connects the leg 9 to the member end 7.

The member 1 further consists of a comparatively short depending tubate sleeve 12 which is welded or otherwise rigidly connected to the central portion of the member section 2.

The device further consists of a leg bracket 13 which is formed from a single piece of bent rod. The front end of the bracket 13 has a vertical stub portion 14 adapted to fit upwardly into the depending sleeve 12 of the front member 1; has a rearwardly extending central horizontal portion 15; and has a depending leg portion 16 which is formed by bending the rear end of the rod downwardly. The lower end of the leg 16 is adapted to be thrust into the earth so as to brace the device firmly against swaying.

A rear horizontal element 17 has a vertically disposed tubular sleeve 18 through which the leg 16 is adapted to be inserted before being thrust into the ground. The element 17 further comprises a horizontal cross-piece 19 with depending end portions 20 and 21. In operatively assembling the element 17 on the rear leg 16, the sleeve 18 is moved upwardly until it reaches the horizontal portion 15 of the bracket. This is, of course, done before the leg 16 is thrust into the ground.

The horizontal portion 15 of tht bracket 13 has a rigidly disposed stud 22 which projects upwardly and rearwardly therefrom at approximately a forty-five degree angle, and the stud is adapted to receive the tubate shank 23 of a loop 24.

In operation, the various parts of the device are assembled as above described, and as illustrated in Fig. 1 of the drawings. The legs 9, 10 and 16 are then thrust into the earth's surface as shown. Conventional fishing poles 30, 31 and 32 may thereafter be supported by the device in the manner illustrated in dotted lines in Fig. 1.

The handle end portion of the central pole 30 is laid over the horizontal portion 2 of the member 1 between the two pins 5 and 6, and its rearmost end is thrust through the loop 24. The pole is therefore held in a position in which its front end, not shown, projects upwardly. When a downward pull is thereafter exerted by a biting fish on the front end of the pole, the loop 24 holds downwardly on the pole handle and prevents its dislocation.

The handle portion of the pole 31 is placed in the deformity or nest 3, and its extreme rear end portion is placed under the cross-piece 19 of the rear horizontal element 17 at one side of the sleeve 18. The pole is thus disposed at an upwardly and forwardly projecting angle so that a downward pull upon the front end of the pole acts to more firmly impinge the same between the nest portion 3 of the front member 1 and the horizontal portion 19 of the rear element 17.

The handle portion of the pole 32 is similarly placed over the nesting portion 4 of the front member 1 and under the cross-piece 19 of the rear element 17.

It is pointed out that all three of the poles may be instantly removed from the device when a fish bites.

When it is desired to stow the device for transporting purposes, the parts are dis-assembled as illustrated in Fig. 2. The legs 9 and 10 of the front member 1 may be folded along the member as illustrated in dotted lines in Fig. 2.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A holder for supporting fishing poles on a stream or lake bank, including: a horizontal front member having a plurality of laterally spaced deformities for nesting a similar plurality of fishing poles thereabove, at points in front of the extreme rear ends of the poles; laterally swingable legs adapted to be thrust into the ground for supporting the member thereabove; a rearwardly extending rod having its front end rigidly connected to said member, and having a downwardly bent free end portion adapted to be thrust into the ground; a loop carried by the rearwardly extending portion of the rod for removably retaining the rear end of a fishing pole; and a rear horizontal element carried by the downwardly bent portion and having downwardly faced deformities for nesting therebelow the butt ends of a plurality of the poles which are resting on said front member.

2. A holder for supporting fishing poles, including: a horizontal front member having spaced depressed sockets for nesting fishing pole handles; legs for supporting the member above the ground; a bracket having its front end connected to the member, and having a leg adapted to be inserted into the ground; a horizontal rear element carried by the bracket; and means on the element for confining the rear ends of said handles therebeneath.

JAMES H. CURTESS

REFERENCES CITED

The following references are of record in the file of this patent:

UNITED STATES PATENTS

| Number | Name | Date |
| --- | --- | --- |
| 525,132 | Burke | Aug. 28, 1894 |
| 1,129,210 | Lenk | Feb. 23, 1915 |
| 1,435,085 | Schumacher | Nov. 7, 1922 |
| 2,202,739 | Kilby | May 28, 1940 |
| 2,466,166 | Fischer | Apr. 5, 1949 |

FOREIGN PATENTS

| Number | Country | Date |
| --- | --- | --- |
| 774,831 | France | Dec. 14, 1934 |